(12) United States Patent
Fontana

(10) Patent No.: US 10,015,572 B2
(45) Date of Patent: Jul. 3, 2018

(54) DOCKING SYSTEM FOR PRESENTATION OF VIDEO ON A FLAT MOBILE COMPUTER

(71) Applicant: Bose Corporation, Framingham, MA (US)

(72) Inventor: Gustavo Fontana, Framingham, MA (US)

(73) Assignee: Bose Corporation, Framingham, MA (US)

( * ) Notice: Subject to any disclaimer, the term of this patent is extended or adjusted under 35 U.S.C. 154(b) by 739 days.

(21) Appl. No.: 14/307,794

(22) Filed: Jun. 18, 2014

(65) Prior Publication Data
US 2015/0373440 A1 Dec. 24, 2015

(51) Int. Cl.
*H04R 1/02* (2006.01)
*G06F 1/16* (2006.01)

(52) U.S. Cl.
CPC ........... *H04R 1/025* (2013.01); *G06F 1/1632* (2013.01); *G06F 1/1688* (2013.01); *H04R 1/028* (2013.01); *H04R 2499/15* (2013.01)

(58) Field of Classification Search
CPC .......... H04R 1/02; H04R 1/025; H04R 1/028; H04R 2499/15; G06F 1/16; G06F 1/1632; G06F 1/1688
USPC ........................................................ 381/388
See application file for complete search history.

(56) References Cited

U.S. PATENT DOCUMENTS

| | | | | |
|---|---|---|---|---|
| D715,289 S | * | 10/2014 | Heck | D14/327 |
| 8,909,838 B2 | * | 12/2014 | Hsu | G06F 1/1632 |
| | | | | 710/303 |
| 9,022,469 B2 | * | 5/2015 | Lavelle | B60N 2/4876 |
| | | | | 297/217.3 |
| 9,088,639 B2 | * | 7/2015 | Chiang | G06F 1/1647 |
| 9,122,447 B2 | * | 9/2015 | Lai | G06F 1/1632 |
| 9,167,711 B2 | * | 10/2015 | Lee | G06F 1/1654 |
| 2008/0304688 A1 | * | 12/2008 | Kumar | G06F 1/1616 |
| | | | | 381/370 |
| 2010/0195279 A1 | * | 8/2010 | Michael | G06F 1/1632 |
| | | | | 361/679.41 |
| 2013/0279100 A1 | * | 10/2013 | Fontana | G06F 1/1632 |
| | | | | 361/679.2 |

OTHER PUBLICATIONS (LuguLake Aluminum Portable Bluetooth 4.0 Speaker with Stand Dock, Hafiz, 2X 3Watts, Enhanced Bass, 10 Hours Playtime-Silver first product review Nov. 6, 2013) https://www.amazon.com/LuguLake-Aluminum-Portable-Bluetooth-Playtime-Silver/dp/B00FGR5XNQ/ref=sr_1_24?ie=UTF8&qid=1489767280&sr=8-24&keywords=%28TABLET+OR+IPAD%29+STAND+SPEAKERS+BLUETOOT.*
(Docking Station with Bluetooth Keyboard & speakers, Date First Available Oct. 28, 2011) https://www.amazon.com/iLuv-WorkStation-Computing-Keyboard-iMM737BLK/dp/B0069RZ1BG/ref=sr_1_19?ie=UTF8&qid=1489767877&sr=8-19&keywords=%28TABLET+OR+IPAD%29+STAND+SPEAKERS+BLUETOOTH+SLIDE.*

(Continued)

*Primary Examiner* — Isam A Alsomiri
*Assistant Examiner* — Amie M Ndure

(57) ABSTRACT

Presentation of video on a flat mobile computing device is enhanced by a support which orients the computing device at an angle of inclination suitable for viewing of video. An acoustic device generates enhanced audio output to accompany the video in response to input from the computing device. The acoustic device and support may be included in a single device. The support may be implemented in an accessory such as a protective cover for the acoustic device.

12 Claims, 23 Drawing Sheets

(56) References Cited

OTHER PUBLICATIONS (iLuv WorkStation Mobile Computing Station with Dock, Keyboard and Audio for Apple iPad, iPhone and iPod Touch (iMM737BLK) Date first available at Amazon.com Nov. 12, 2013) https://www.amazon.com/Docking-Station-Bluetooth-Keyboard-speakers/dp/B00GMSOOK6/ref=sr_1_132?ie=UTF8&qid=1489769141&sr=8-132&keywords=%22COMPUTER+KEYBOARD%22+BUILT+IN+SPEAK.*

* cited by examiner

DOCKING SYSTEM FOR PRESENTATION OF VIDEO ON A FLAT MOBILE COMPUTER

BACKGROUND

This disclosure relates generally to mobile computing devices. A wide variety of mobile computing devices exist. Such devices are often smaller and more highly integrated than computers which are not designed for mobility. Laptop computers, for example, may integrate a battery, keyboard, pointing device, display, processing resources, and storage resources in a single device. Laptops have a two part clamshell form factor. The display is in one part of the clamshell and the other components are in the other part. The two parts are connected by a hinge so the display can be folded down over the keyboard for transport or when not in use. Another type of mobile computing device includes a touch screen display, battery, processing resources, and storage resources in a single device without independently movable parts. Examples include but are not limited to tablets, mini tablets, slates, mobile phones, and phablets. Such devices may have a parallelpiped, cuboid or other form factor with eased edges and corners. The touch screen may obviate the need for an integrated keyboard and pointing device, although these and other components may be available as accessories. In some designs the thickness dimension may be significantly smaller than the height and width dimensions, resulting in a "flat" device which may be more easily transportable than thicker devices. These devices are typically supported by the operator during use, e.g., hand held.

SUMMARY

All examples and features mentioned below can be combined in any technically possible way.

In one aspect an apparatus comprises an accessory for supporting a flat mobile computing device having a display, processor, memory and battery within a housing having first and second sets of parallel edges, a back surface connected to the edges, and a front surface connected to the edges and including the display, the accessory comprising: a support which orients the computing device at an angle of inclination such that a first edge of the first set of parallel edges of the computing device is elevated relative to a second edge of the first set of parallel edges, the support adapted to accommodate a range of computing device thicknesses; and an acoustic device which generates an audio output in response to input from the computing device.

Embodiments may include one of the following features, or any combination thereof. The support may comprise a protective cover for the acoustic device. The protective cover may include a top surface, a bottom surface, a set of parallel side surfaces connected to both the top and bottom surfaces, a back surface connected to the top, bottom, and side surfaces, and a front opening adapted to receive the acoustic device. The acoustic device may be slidably movable within the cover. An interference fit may be presented between the acoustic device and the cover. The angle of inclination of the computing device may be adjustable based on an extent to which the acoustic device is inserted into the cover. The cover may include an elongated opening in the top surface, the opening extending through a part of the side surfaces and adapted to receive one of the edges of the computing device. The cover may include first and second flat notched arms movably connected to respective ones of the parallel side surfaces, the notched arms adapted to receive one of the edges of the computing device when extended. The cover may include a slotted surface which extends from the top surface, the slotted surface having first and second side arms movably connected to respective ones of the parallel side surfaces, the slotted surface adapted to receive one of the edges of the computing device when extended. The support may include a first section and a second section, the first section pivotably connected to a second section and including a first edge which is disposed against a corresponding first edge of the second section in a packed configuration. The first section may include a ledge on the first edge, the ledge adapted to receive one of the edges of the computing device when in an unpacked configuration. The first section may be pivotably connected to the second section via a hinge proximate to bottom surface of the support. The support may include a first section which is slidably connected to a second section, and wherein an elongated slot is formed between a first edge of the first section and a first edge of the second section when the first section is moved slidably away from the second section into an unpacked configuration, the slot adapted to receive one of the edges of the computing device. The first edge of the first section may be disposed against the first edge of the second section in a packed configuration. The slot may have a variable thickness dimension which is adjusted based on an extent to which the first section is moved slidably away from the second section. The acoustic device may include first and second acoustic sources, the first acoustic source projecting sound from a front portion of the device and the second acoustic source projecting sound from a rear portion of the device. The first acoustic source may be adapted to produce higher frequency sound than the second acoustic source. The first acoustic source may be configured to project sound from in front of the flat mobile computing device and the second acoustic source may be configured to project sound from behind the flat mobile computing device. The cover may include openings in the top surface proximate to the second acoustic source. The acoustic device may include a wired interface adapted to connect to the computing device. The acoustic device may include a wireless interface adapted to connect to the computing device. The angle of inclination may be selected for presentation of video on the computing device. The angle of inclination may be settable by a user within a predetermined range. The computing device may be selected from: a tablet, a mini tablet, a slate, a phone, and a phablet.

In another aspect a system is provided for orienting a flat mobile computing device having a display, processor, memory and battery within a housing having first and second sets of parallel edges, a back surface connected to the edges, and a front surface connected to the edges and defined by the display, the system comprising: a support which orients the computing device at an angle of inclination such that a first edge of the first set of parallel edges is elevated relative to a second edge of the first set of parallel edges; and an acoustic device which generates an audio output in response to input from the computing device.

Embodiments may include one of the following features, or any combination thereof. The support may comprise a protective cover for the acoustic device, the protective cover including a top surface, a bottom surface, a set of parallel side surfaces connected to both the top and bottom surfaces, a back surface connected to the top, bottom, and side surfaces, and a front opening adapted to receive the acoustic device. The cover may comprise an elongated opening in the top surface, the opening extends through a part of the side surfaces and adapted to receive one of the edges of the computing device. The cover may comprise first and second flat notched arms movably connected to respective ones of the parallel side surfaces, the arms adapted to receive one of the edges of the computing device when extended. The cover may comprise a slotted surface which extends from the top surface, the slotted surface having first and second side arms movably connected to respective ones of the parallel side surfaces, the slotted surface adapted to receive one of the edges of the computing device when extended. The support may comprise a first section and a second section, the first section pivotably connected to a second section and including a first edge which is disposed against a corresponding first edge of the second section in a packed configuration, and wherein the first section includes a ledge on the first edge, the ledge adapted to receive one of the edges of the computing device when in an unpacked configuration. The support may comprise a first section which is slidably connected to a second section, and wherein an elongated slot is formed between a first edge of the first section and a first edge of the second section when the first section is moved slidably away from the second section into an unpacked configuration, the slot adapted to receive one of the edges of the computing device. The acoustic device may comprise a wireless interface adapted to connect to the computing device. The computing device may be selected from: a tablet, a mini tablet, a slate, a phone, and a phablet.

In another aspect an apparatus comprises: a protective cover for an acoustic device which generates an audio output in response to input from a flat mobile computing device, the cover orienting the computing device at an angle of inclination such that at least first and second parallel edges of the computing device are at different elevations, the cover adapted to accommodate a range of computing device thicknesses, and also adapted to at least partially enclose the acoustic device.

Embodiments may include one of the following features, or any combination thereof. The apparatus may comprise a top surface, a bottom surface, a set of parallel side surfaces connected to both the top and bottom surfaces, a back surface connected to the top, bottom, and side surfaces, and a front opening adapted to receive the acoustic device. The apparatus may comprise an elongated opening in the top surface, the opening extending through a part of the side surfaces and adapted to receive one of the edges of the computing device. The apparatus may comprise first and second flat notched arms movably connected to respective ones of the parallel side surfaces, the arms adapted to receive one of the edges of the computing device when extended. The apparatus may comprise a slotted surface which extends from the top surface, the slotted surface having first and second side arms movably connected to respective ones of the parallel side surfaces, the slotted surface adapted to receive one of the edges of the computing device when extended.

In another aspect an apparatus comprises means for supporting a flat mobile computing device having a display, processor, memory and battery within a housing having first and second sets of parallel edges, a back surface connected to the edges, and a front surface connected to the edges and including the display, the apparatus comprising: support means which orients the computing device at an angle of inclination such that a first edge of the first set of parallel edges of the computing device is elevated relative to a second edge of the first set of parallel edges, the support means accommodating a range of computing device thicknesses; and means for generating an audio output in response to input from the computing device.

DETAILED DESCRIPTION

Flat mobile computing devices including but not limited to tablets, mini tablets, slates, mobile phones, and phablets are increasing in popularity. These mobile computing devices often integrate a touch screen display with computing and storage resources in a single unit having a parallelpiped, cuboid or other form factor with eased edges and corners. The devices are "flat" in the sense that they have a thickness dimension that is smaller than the height and width dimensions, and in some designs significantly smaller. For example, Apple iPad tablets have a height of about 240 mm, a width of about 190 mm, and a thickness (depth) of about 10 mm. Unlike desktop, all-in-one, and laptop computers, the display of a flat mobile computing device is typically supported by the operator during use, e.g., held in hand, because there is no built-in means of support. Moreover, the integrated speakers of the flat computing device may be limited in terms of sound quality and loudness. The inventors have recognized a need for supporting flat mobile computing devices at an inclination suitable for viewing of the display while providing enhanced audio output, e.g., for presentation of video content on the computing device. Some examples of docking systems for presentation of video on flat mobile computing devices with enhanced audio are described below.

Figure 1:
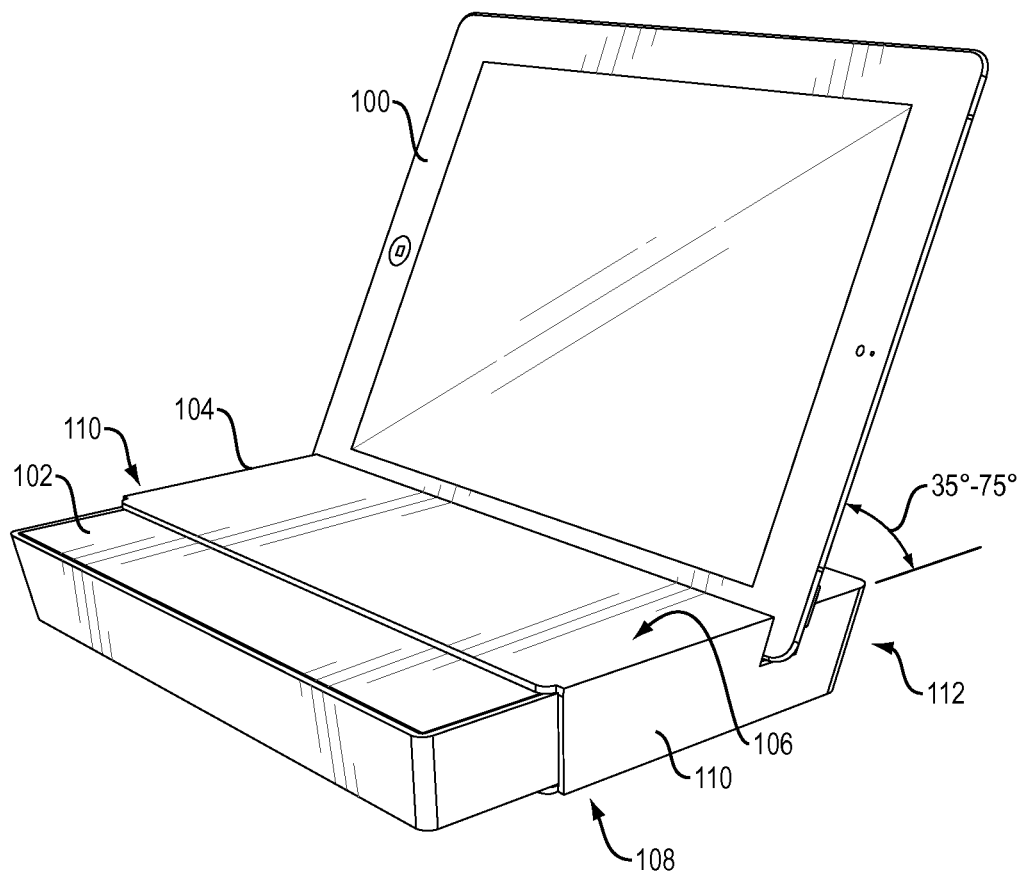
FIG. 1 is perspective view of a docking system for presentation of video on a flat mobile computing device, the system including an acoustic device and a protective case having an elongated opening for supporting the computing device.

Referring generally to FIG. 1, one type of docking system for a flat mobile computing device 100 includes an acoustic device 102 such as a "speaker pack" and a support structure 104. For example, a protective case for the acoustic device may function to support a docked computing device at an inclination suitable for the viewing of video content on the display of the computing device, e.g., 35-75 degrees from horizontal when the acoustic device is resting on a horizontal surface. Some aspects which may be common to different implementations of this general type of docking system are described below.

Figure 2:
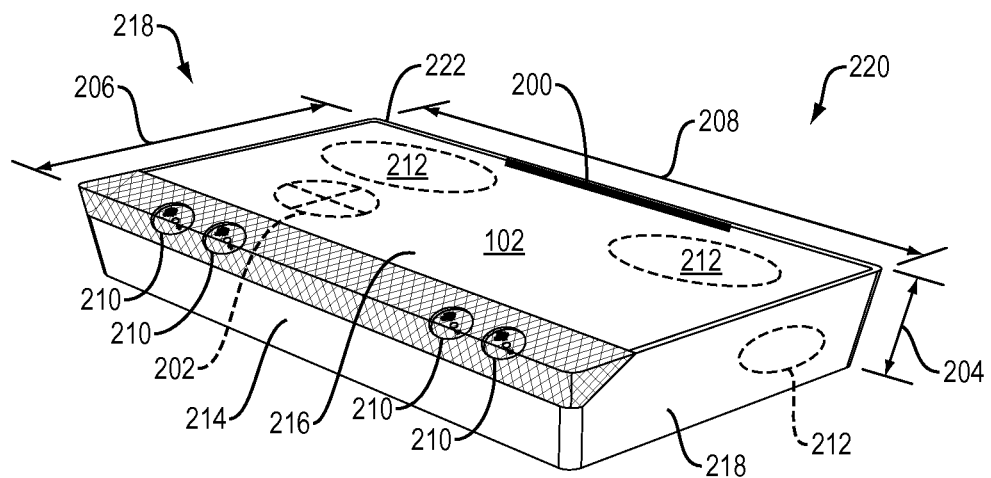
FIG. 2 is a perspective view of the acoustic device.
Figure 3:
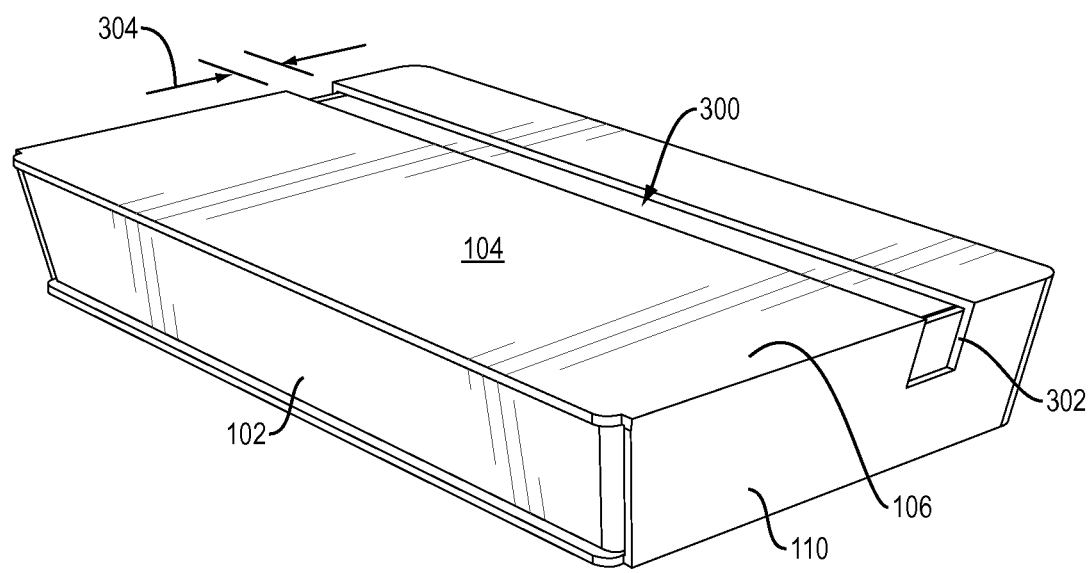
FIG. 3 is a perspective view of the acoustic device and protective case of FIG. 1 in a packed configuration.

Referring to FIGS. 1 and 2, the acoustic device 102 provides enhanced audio output in response to signals associated with the video being presented. The signals are transmitted from the computing device 100 to the acoustic device 102. A wired interface 200 may be used for communication between the acoustic device and the flat computing device, e.g., "hard docking." For example, a multi-pin connector located along an edge of the flat computing device may mate with a corresponding connector located along the back of the acoustic device. Audio data associated with the displayed video may be transmitted from the computing device to the acoustic device via the connector, and the corresponding sound may be reproduced by the acoustic device, e.g., with greater quality, loudness or both in comparison with the audio capabilities of the computing device. Moreover, power may be shared via the connector, e.g., from the computing device to the acoustic device, from the acoustic device to the computing device, or in either direction depending upon battery state and other conditions. In another implementation the acoustic device may include a wireless interface 202 for establishing communication with the flat computing device, e.g., "soft docking." For example, a short range wireless networking protocol including but not limited to Bluetooth and IEEE 802.11 WiFi could be used to transmit the audio data from the computing device to the acoustic device. The wireless interface may include wireless power transfer technologies such as induction based components to share power in either direction. One aspect of use of a "soft dock" implementation with a wireless interface is that the user can conveniently and temporarily physically move (undock) the computing device away from the acoustic device in order to perform other tasks. It should be noted that undocking the computing device from the acoustic device in this circumstance does not necessarily imply loss of communication when a wireless interface is utilized. For example, the audio device may continue to produce sound associated with the video when the computing device is undocked but still within range of wireless communications. However, it may be desirable in some implementations to activate the audio resources of the computing device when the computing device is moved away from the acoustic device, and to deactivate the audio resources of the computing device when the computing device is in close proximity to the acoustic device, e.g., docked. Any of a wide variety of techniques and components could be utilized to sense such proximity.

The acoustic device 102 may be implemented in any of a wide variety of shapes, including but not limited to parallelpiped, rectangular cuboid, rhomboid, three dimensional isosceles trapezoid and other shapes, possibly with one or more eased edges. Regardless of the shape, a "flat" form factor may be implemented such that a thickness dimension 204 is less than a length dimension 206 and a width dimension 208, possibly but not necessarily significantly less, thereby facilitating convenient packing and transport. The acoustic device may have internal power storage resources such as rechargeable or disposable batteries, and may be equipped with features for deriving power from external sources such as electrical outlets. A wide variety of components may be included in the acoustic device including, for example and without limitation, processors, computer-readable memory, amplifiers, and various audio components, e.g., and without limitation, directional high frequency transducers 210 and low frequency transducers 212. Passive radiators and any of a wide variety of other audio components may also be used. In one implementation the directional high frequency transducers are located proximate to the front of the acoustic device, e.g., in front of the docked mobile computing device 100, and project sound through a grill. More particularly, the transducers and grill may be at the front edge 214 of the device, the top surface 216 of the device proximate to the front edge, or at an angle, e.g., without limitation, of about 35-75 degrees relative to the top surface such that the high frequency audio output is directed toward the user partly through the front edge and partly through the top surface when the user is in front of the acoustic device. The low frequency transducers 212, which may be omni-directional, may be located closer to the back of the acoustic device, e.g., behind the docked mobile computing device. For example, the low frequency transducers may project sound through a grill at one or both sides 218 (one side hidden in the perspective view) of the device, the top surface of the device, the back 220 (hidden in the perspective view) of the device, or any combination thereof.

The protective case 104 may form a flexible open sleeve with a top wall 106, a bottom wall 108 (hidden in the perspective view), a set of parallel side walls 110 (one side hidden in the perspective view) connected to both the top and bottom walls, and a back wall 112 (hidden in the perspective view) connected to the top, bottom, and side walls, thereby defining an interior volume and a front opening adapted to receive the acoustic device 102. The dimensions of the protective case 104 may be selected based on the dimensions of the acoustic device 102 to be protected, e.g., such that the various interior surfaces of the top, bottom, side and back walls of the case are in contact with the acoustic device when the acoustic device is fully inserted into the case. Moreover, an interference fit may be presented between the acoustic device and case such that the acoustic device does not slide too easily out of the protective case.

Figure 4:
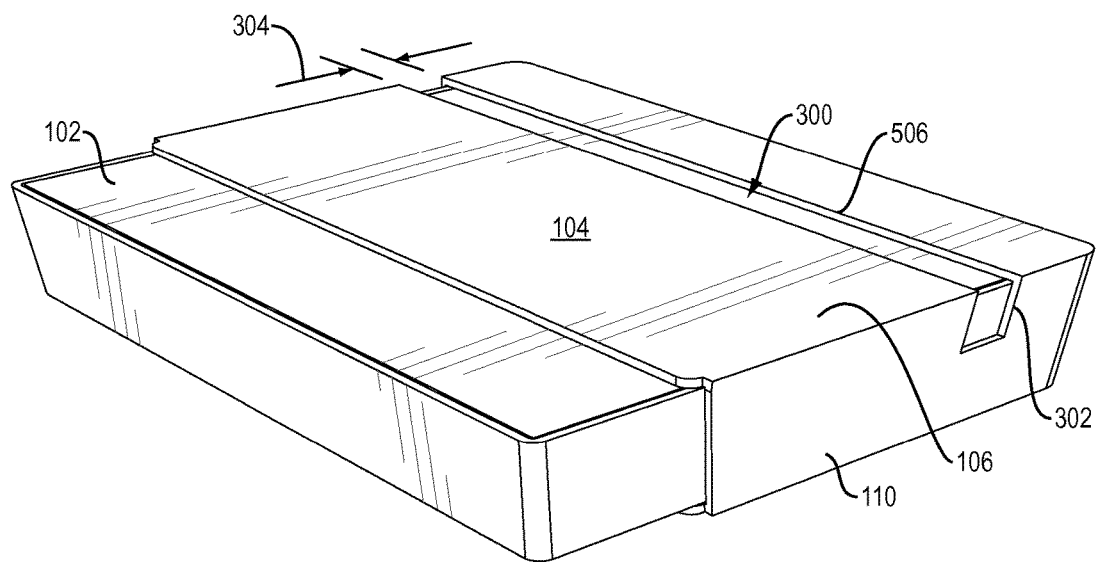
FIG. 4 is a perspective view of the acoustic device and protective case of FIG. 1 in an unpacked configuration.
Figure 5:
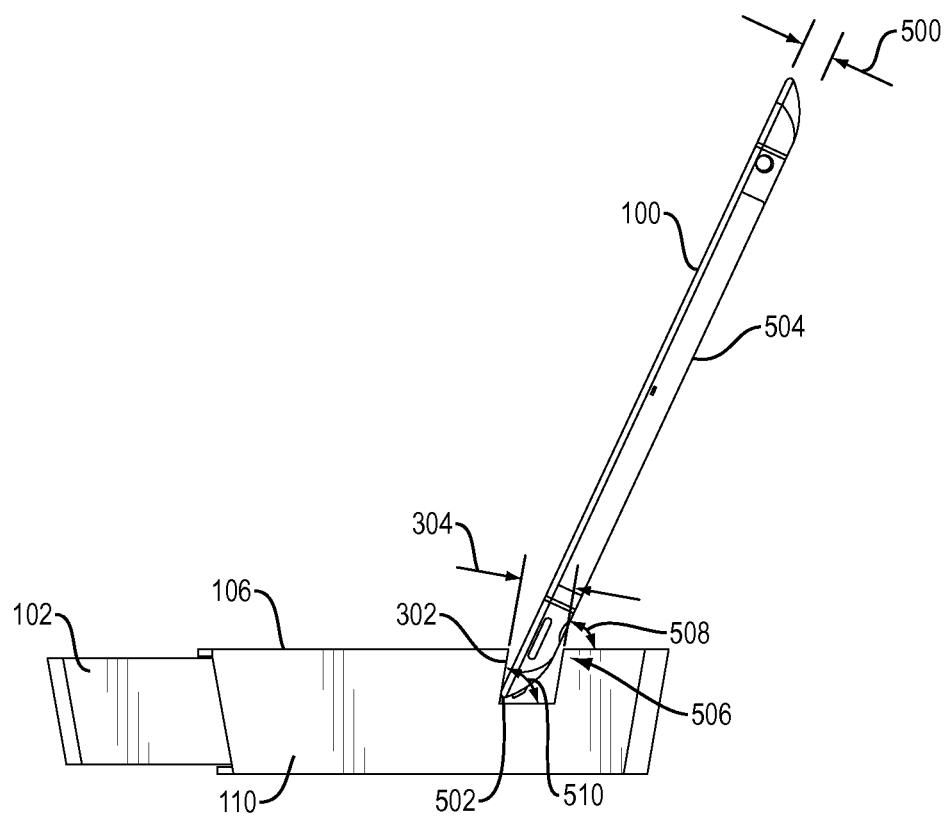
FIG. 5 is a side elevation of the system of FIG. 1.
Figure 6:
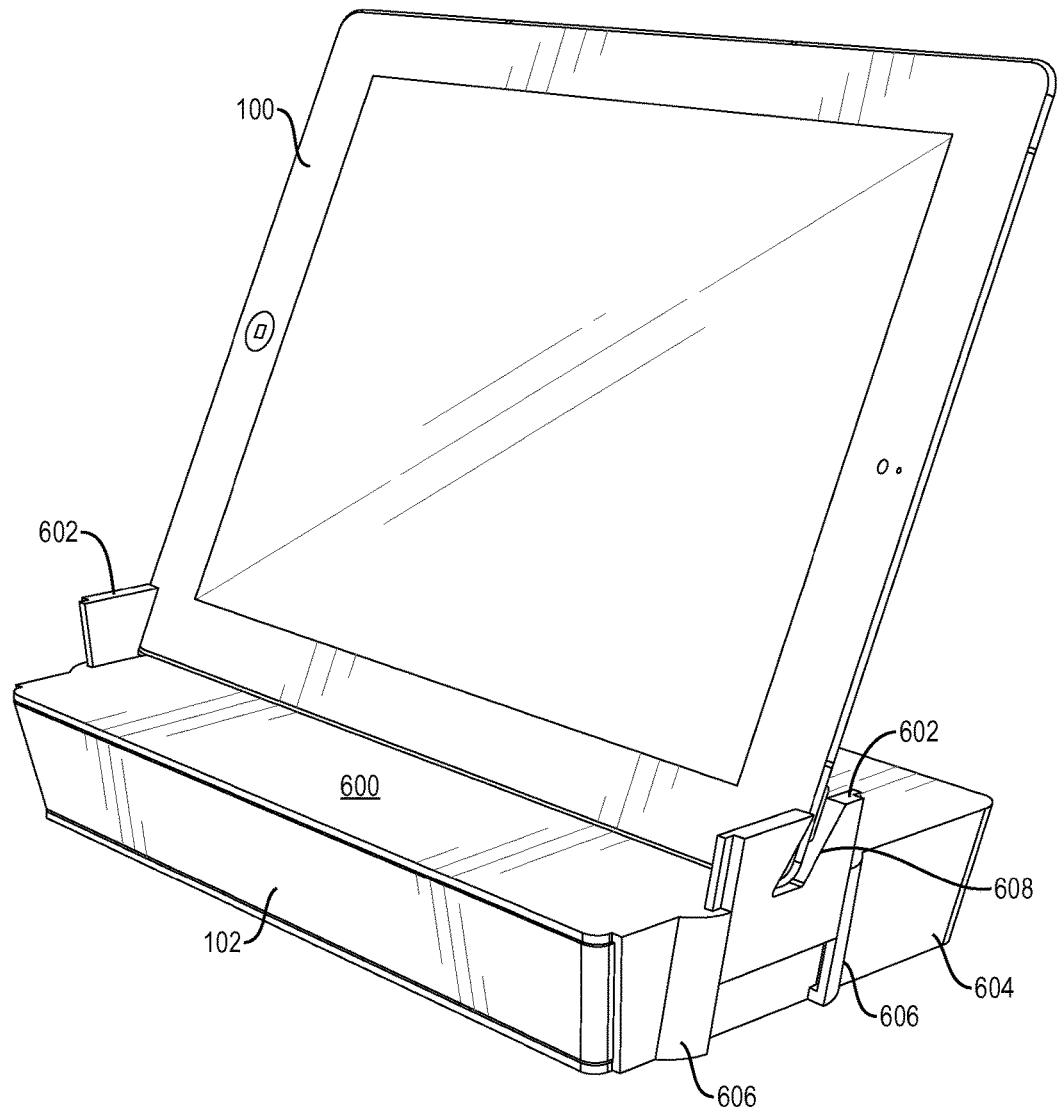
FIG. 6 is perspective view of a docking system for presentation of video on a flat mobile computing device, the system including an acoustic device and a protective case having notched arms for supporting the computing device.

The specific implementation shown in FIGS. 1 and 3 through 5 includes a protective case with an elongated opening 300 for supporting the computing device 100. The elongated opening is formed as a slot through the top wall 106 of the case, and partially traverses the side walls 110 of the case as notches 302. The notches may be angled, e.g., angle 510 of 35-75 degrees relative to the top surface. The elongated opening is adapted to receive one of the edges of the flat computing device 100. For example, the opening has a width dimension 304 which is equal to or greater than the thickness dimension 500 of the flat computing device. Moreover, the thickness dimension may be selected to accommodate a variety of computing devices of different thicknesses. A supported edge 502 of the computing device rests in the notches 302 formed in the side walls 110. The back 504 of the computing device is supported by the top wall 106 along edge 506 proximate to the opening such that the computing device is cantilevered at a suitable angle relative to the acoustic device for viewing of video, e.g., 35-75 degrees when the acoustic device is resting on the lap of the user. The angle of inclination 508 of the computing device is in part a function of the angle 510 of the notches. As specifically shown in FIG. 3, the acoustic device 102 blocks the elongated opening 300 when in a packed state, e.g., when the acoustic device 102 is fully inserted into the case 104, such as in preparation for transport. In order to prepare to dock the computing device the acoustic device 102 is partially removed from the case such that the opening 300 is unblocked as shown in FIG. 4. The computing device may then be inserted into the opening as shown in FIG. 5. If the thickness 304 of the opening is greater than the thickness 500 of the computing device then the angle of inclination 508 of the computing device relative to the top surface of the case may be adjusted by relocating the supported edge 502 of the computing device with the top back edge 222 (FIG. 2) of the acoustic device, e.g., pushing the portion of the computing device inserted in the case toward the back of the case in order to increase the angle of inclination 508. The friction presented by the interference fit between the case and the audio device may be selected such that a selected angle of inclination can be maintained in this manner.

Figure 7:
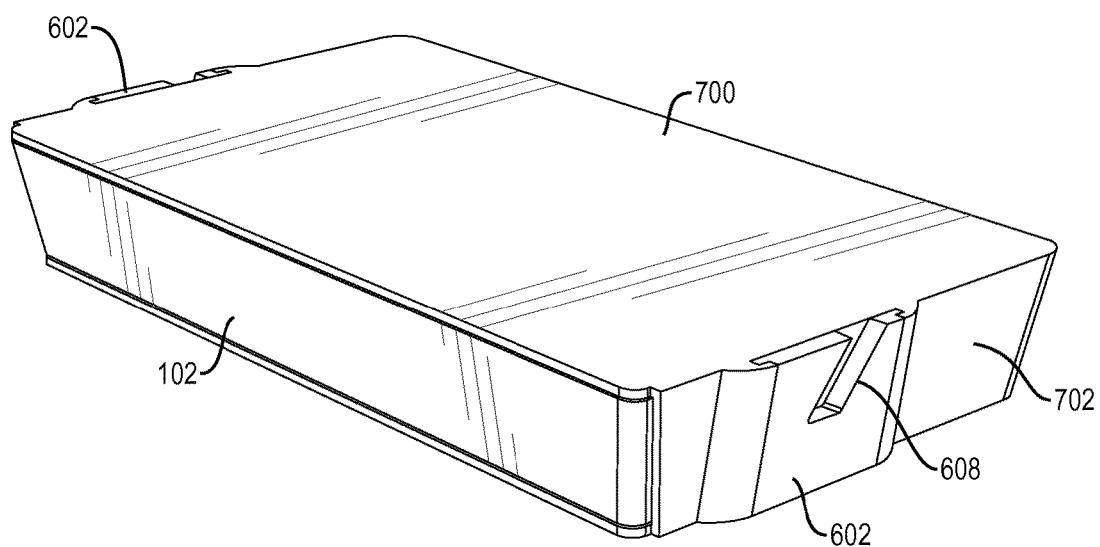
FIG. 7 is a perspective view of the acoustic device and protective case of FIG. 6 in a packed configuration.
Figure 8:
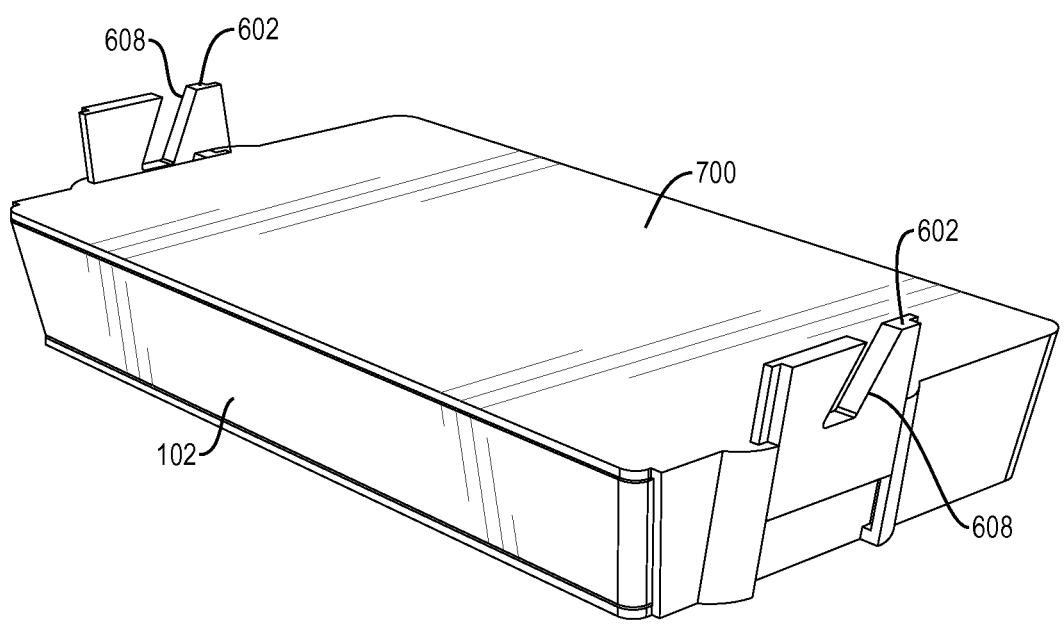
FIG. 8 is a perspective view of the acoustic device and protective case of FIG. 6 in an unpacked configuration.
Figure 9:
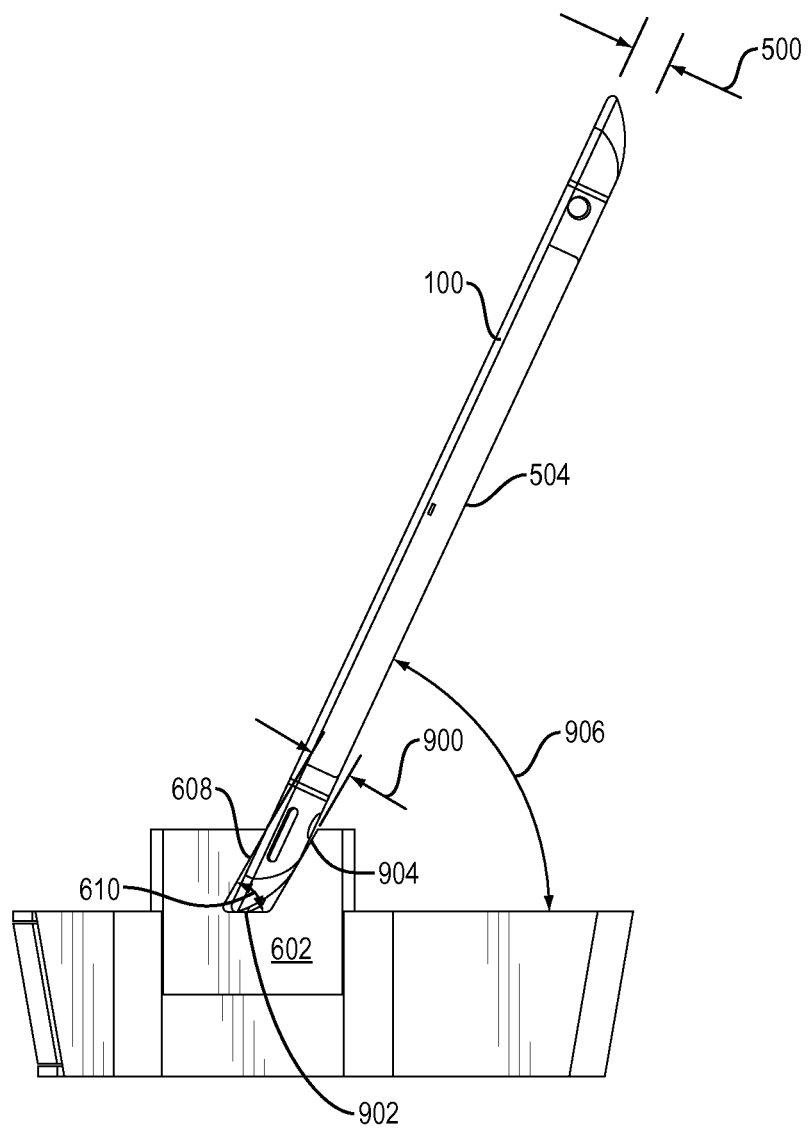
FIG. 9 is a side elevation of the system of FIG. 6.
Figure 10:
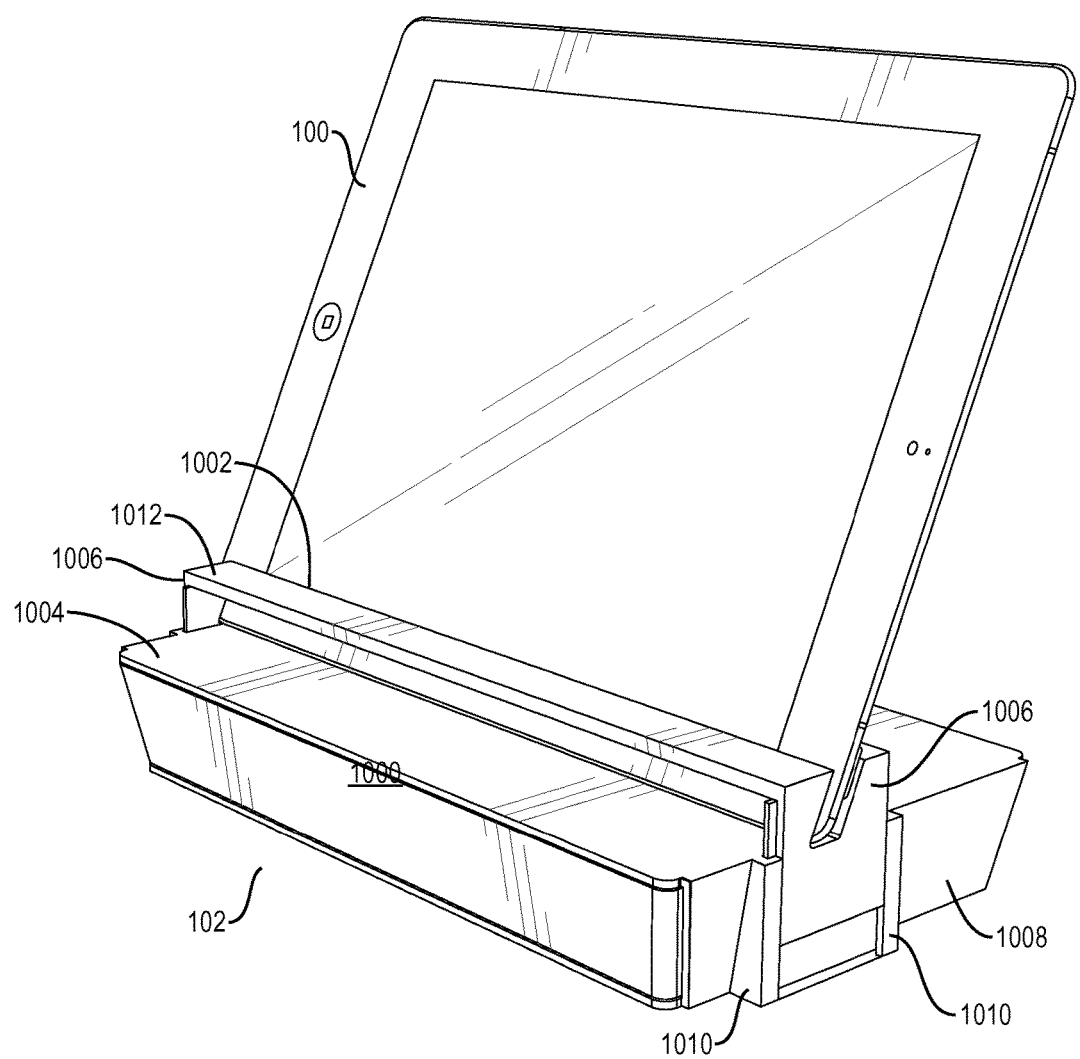
FIG. 10 is perspective view of a docking system for presentation of video on a flat mobile computing device, the system including an acoustic device and a protective case having a slotted surface which extends from the top surface via notched side arms.

Another specific implementation of a docking system of the type described above is shown in FIGS. 6 through 9. In this implementation the protective case 600 includes first and second docking arms 602 movably connected to respective ones of parallel side walls 604. The docking arms 602 are retained in slots formed by protrusions 606. More particularly, the docking arms are slidably movable in their respective slots presented between corresponding protrusions. A retaining feature may be provided to prevent the docking arms from being removed from the slots. The docking arms may include angled notches 608, e.g., presenting an angle 610 of 35-75 degrees relative to the top surface of the case 600, which are adapted to receive one of the edges of the computing device 100 when the arms are extended. For example, the notches may have a thickness dimension 900 which is equal to or greater than the thickness dimension 500 of the flat computing device 100, e.g., a thickness dimension selected to accommodate a variety of computing devices of different thicknesses. The supported edge 902 of the computing device rests in the notches when the computing device is docked, and the back 504 of the computing device is supported by the back edge 904 of the notches such that the computing device is cantilevered at a suitable angle 906 relative to the acoustic device for viewing of video, e.g., an angle between 35 and 75 degrees determined by the thickness of the computing device, and angle and thickness of the notches. As specifically shown in FIG. 7, the notch 608 is blocked by the top wall 700 and side wall 702 of the case in a packed state, i.e., when the acoustic device is fully inserted into the case and the arms 602 are fully inserted into their respective slots, such as in preparation for transport. In order to dock the computing device the docking arms 602 are extended from the case such that the slots 608 are unblocked as shown in FIG. 8. FIG. 9 illustrates the computing device 100 being supported by the docking arms 602. Note that the acoustic device 102 can remain fully inserted in the protective case in the unpacked state.

Figure 11:
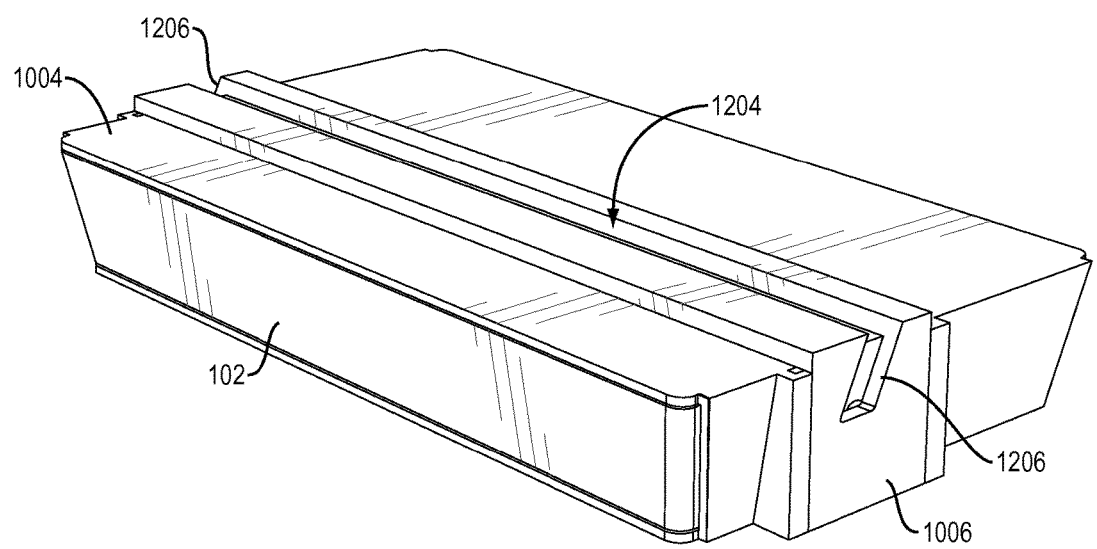
FIG. 11 is a perspective view of the acoustic device and protective case of FIG. 10 in a packed configuration.
Figure 12:
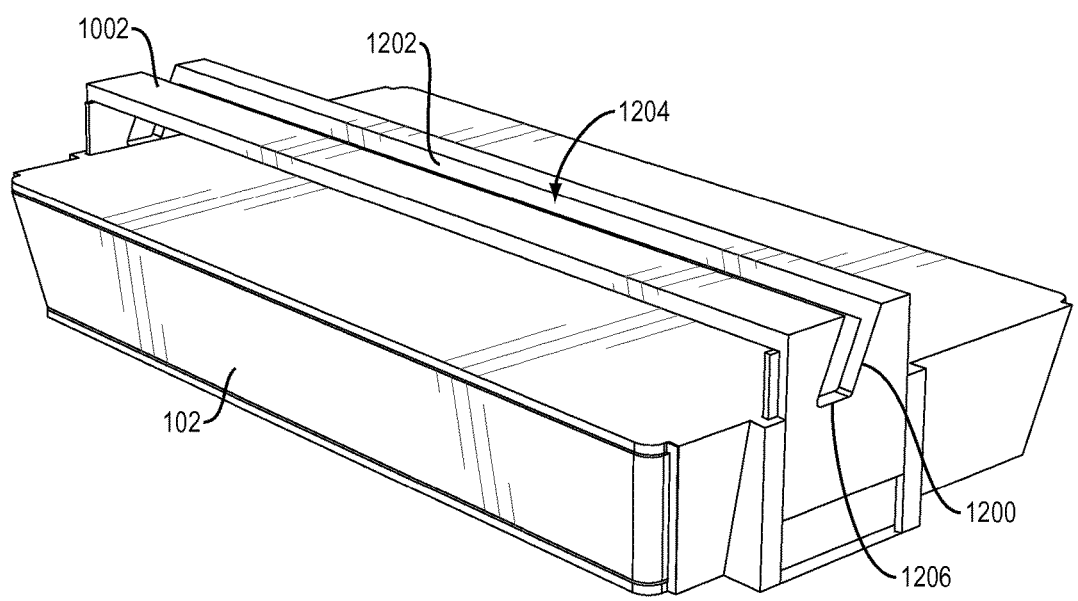
FIG. 12 is a perspective view of the acoustic device and protective case of FIG. 10 in an unpacked configuration.
Figure 13:
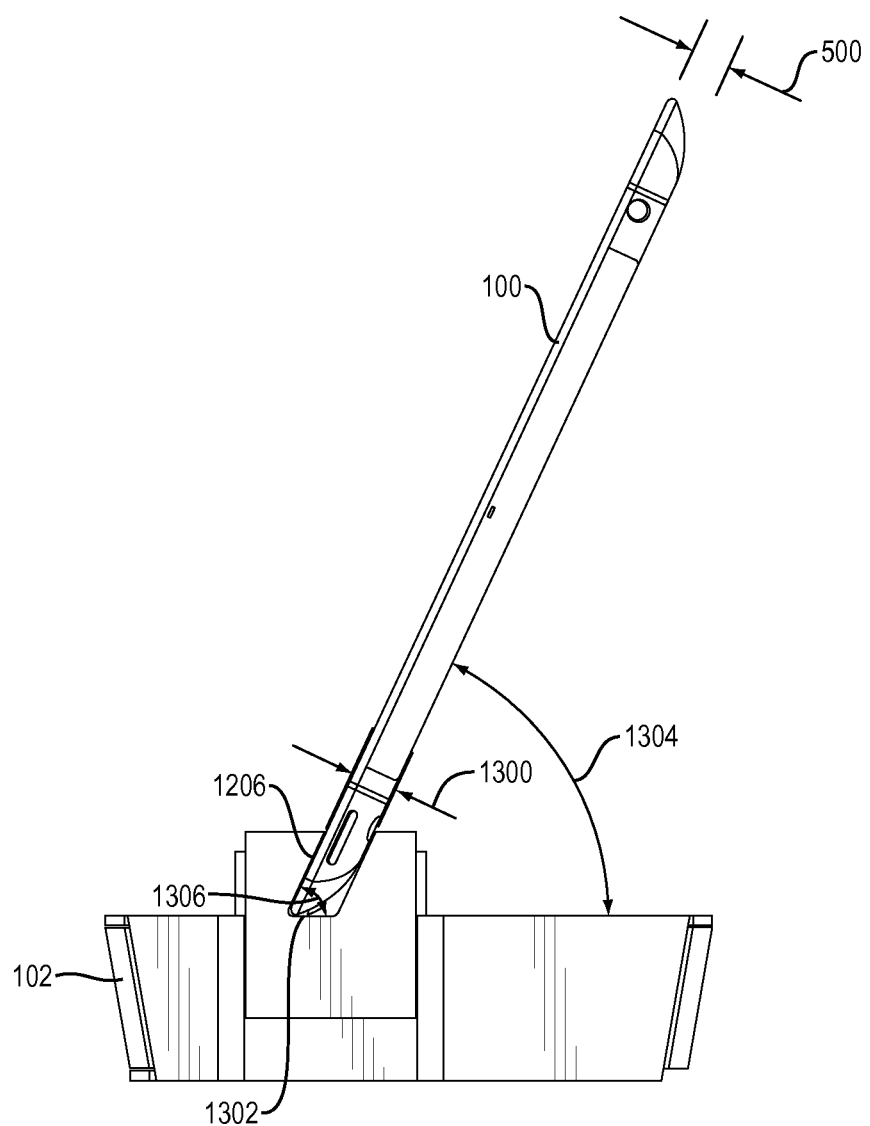
FIG. 13 is a side elevation of the system of FIG. 10.
Figure 14:
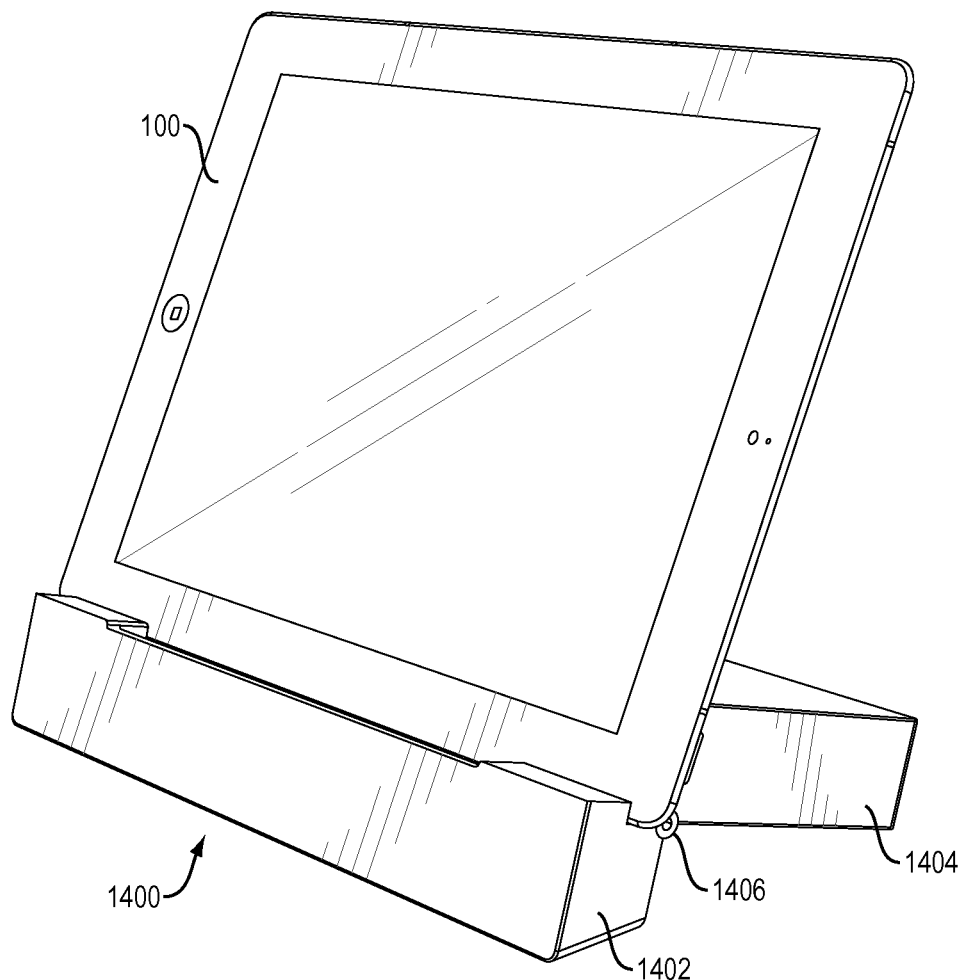
FIG. 14 is perspective view of a docking system for presentation of video on a flat mobile computing device, the system including an acoustic device with a first section pivotably connected to a second section such that a supporting ledge can be presented by pivoting the first section away from the second section.

Another specific implementation of a docking system of the type described above is shown in FIGS. 10 through 13. In this implementation the protective case 1000 includes a docking member 1002 which extends from the top wall 1004 of the case. The slotted docking member includes first and second flat notched side arms 1006 movably connected to respective ones of the parallel side walls 1008 of the case. The notched side arms 1006 of docking member 1002 are retained in slots formed by protrusions 1010. More particularly, the notched side arms are slidably movable in their respective slots. A retaining feature may be provided to prevent the arms from being removed from the slots. A slotted cross-member 1012 interconnects the side arms 1006, thereby providing the docking member 1002 adapted to receive one of the edges of the computing device when extended. For example, the slot 1204 and notches 1206 have a thickness dimension 1300 which is equal to or greater than the thickness dimension 500 of the flat computing device, e.g., a thickness dimension selected to accommodate a variety of computing devices of different thicknesses. The supported edge 1302 of the computing device 100 rests in the notches when the computing device is docked, and the back of the computing device is supported by the back edge 1200 of the notches and the back edge 1202 of the slotted cross-member such that the computing device is cantilevered at a suitable angle relative to the acoustic device for viewing of video, e.g., when the acoustic device is resting on the lap of the user. Note that the angle of inclination 1304 of the computing device is in part a function of the angle 1306 of the notches, e.g., 35-75 degrees relative to the top surface. As specifically shown in FIG. 11, the notches 1206 and slot 1204 are blocked by the top wall 1004 of the case in a packed state, i.e., when the acoustic device 102 is fully inserted into the case and the side arms 1006 are fully inserted into their respective slots, such as in preparation for transport. In order to dock the computing device the docking member 1002 is extended from the case such that the notches 1206 and slot 1204 are unblocked as shown in FIG. 12. FIG. 13 illustrates the computing device 100 being supported by the slotted surface. Note that the acoustic device 102 can remain fully inserted in the protective case in the unpacked state.

Figure 15:
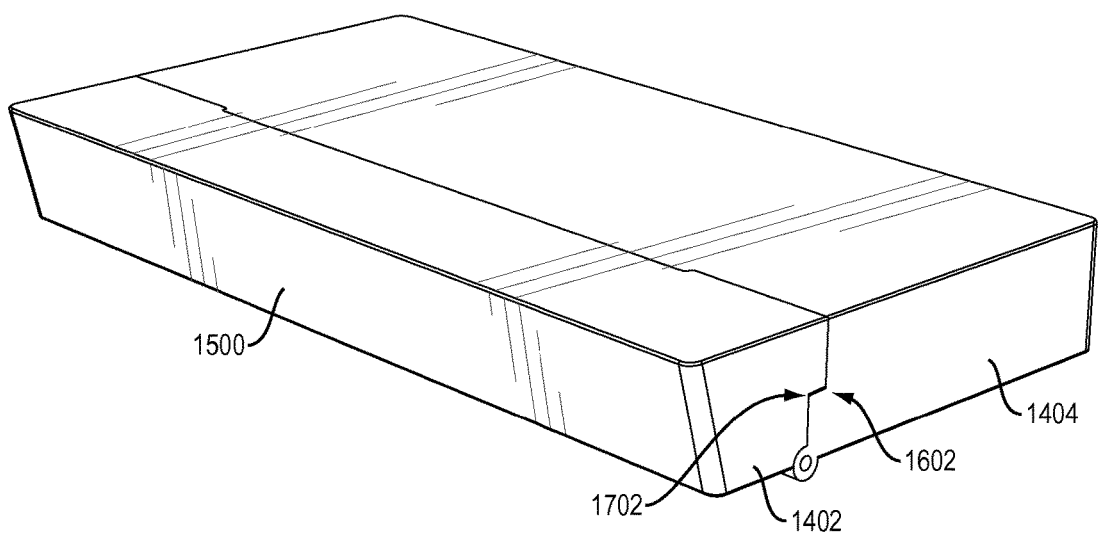
FIG. 15 is a perspective view of the acoustic device of FIG. 14 in a packed configuration.
Figure 16:
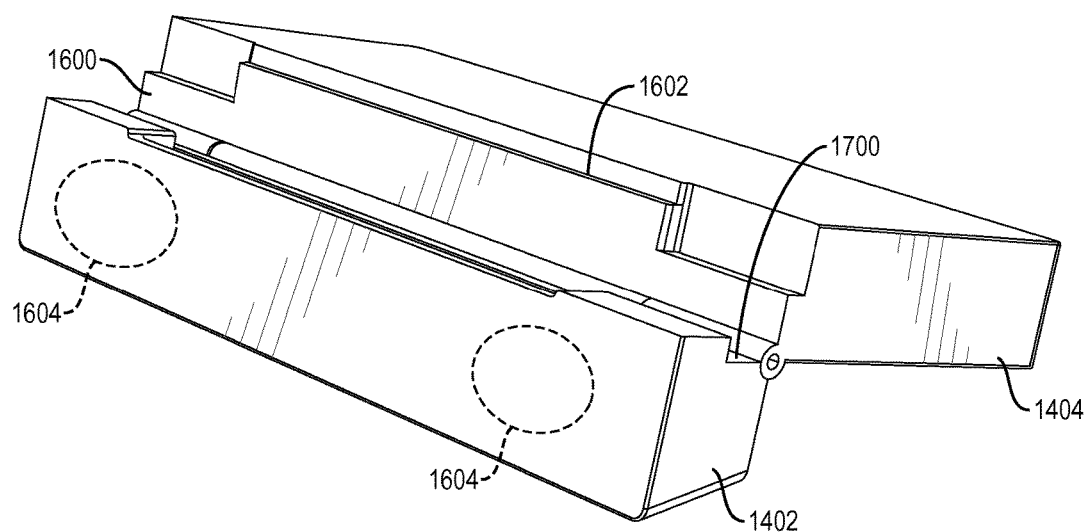
FIG. 16 is a perspective view of the acoustic device of FIG. 14 in an unpacked configuration.
Figure 17:
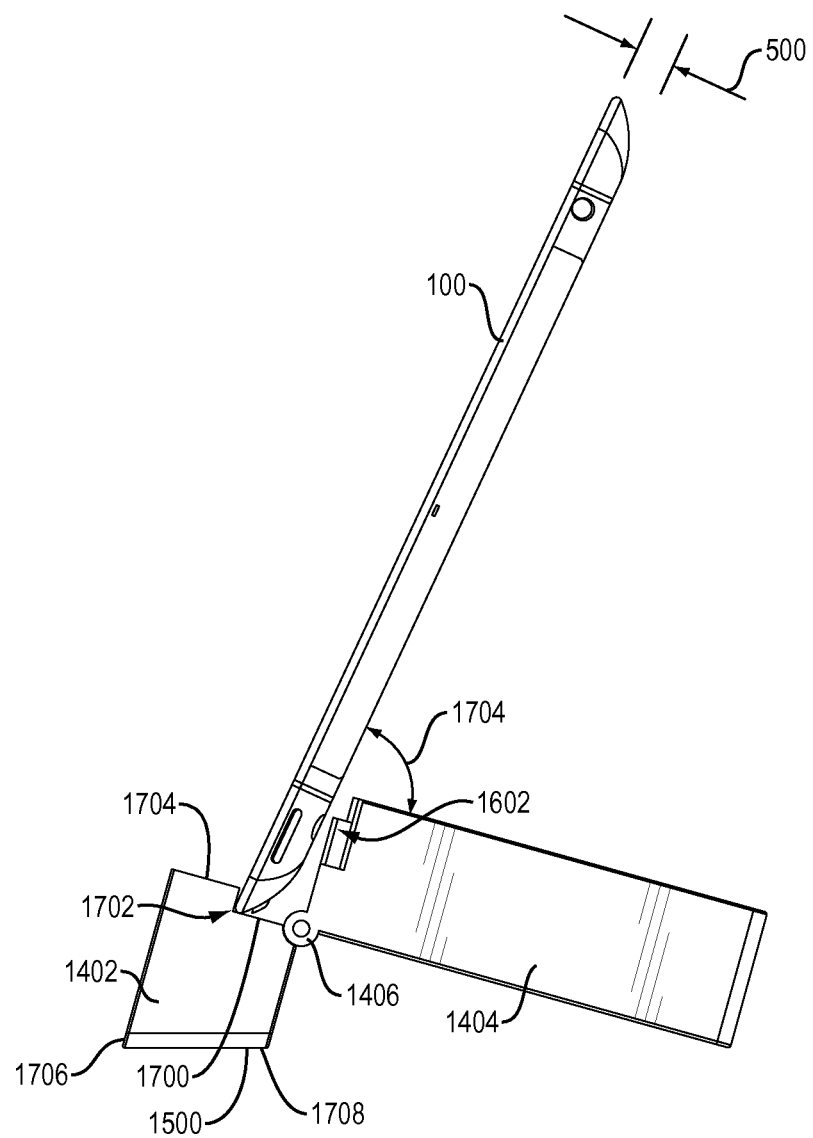
FIG. 17 is a side elevation of the system of FIG. 14.
Figure 18:
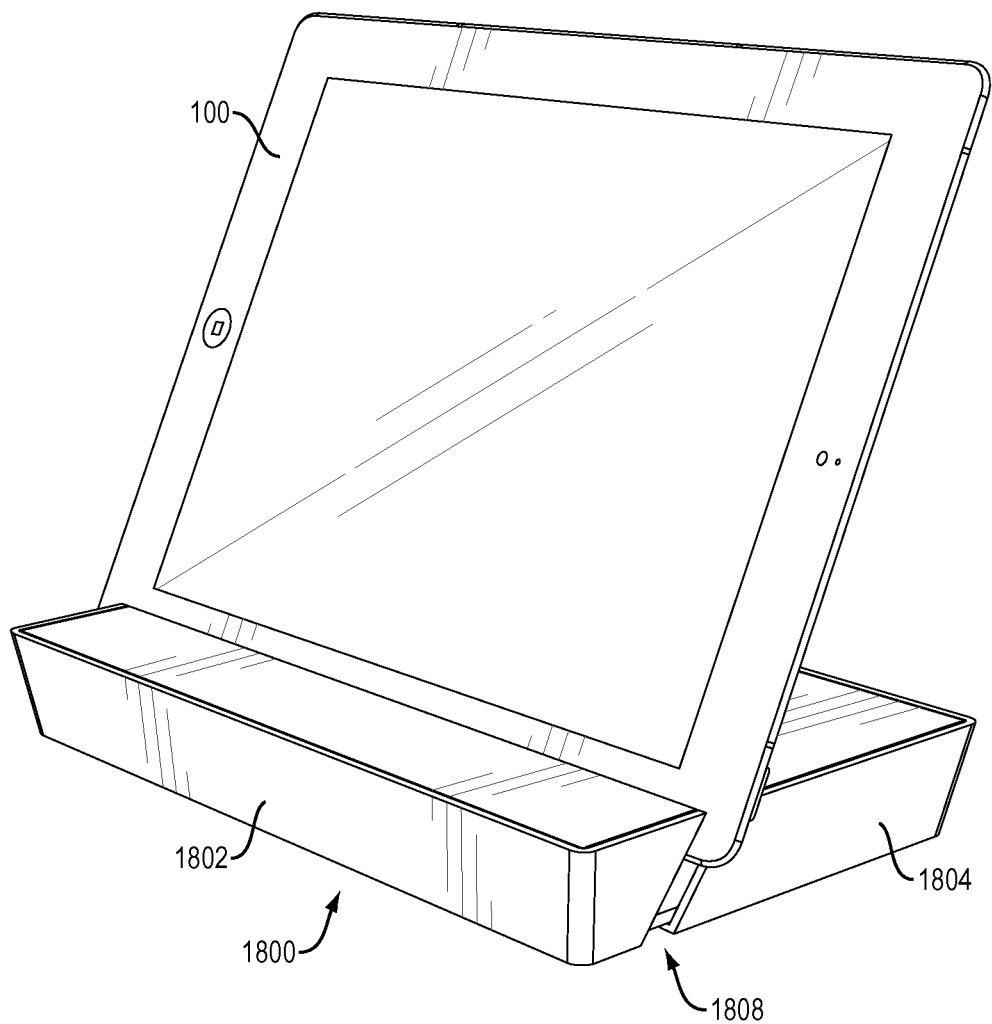
FIG. 18 is perspective view of a docking system for presentation of video on a flat mobile computing device, the system including an acoustic device with a first section slidably connected to a second section such that a supporting slot can be presented by sliding the first section away from the second section.

FIGS. 14 through 17 illustrate an implementation in which the acoustic device 1400 has a feature for supporting the computing device 100. The acoustic device may include any of the various features described above, but also includes an adaptation of being in two parts which are interconnected. More particularly, the acoustic device includes a front section 1402 which is pivotably connected to a back section 1404 by a hinge 1406. A supporting ledge 1700 formed by a jog 1702 of a back wall 1704 of the front section 1402 is presented by pivoting the front section 1402 away from the back section 1404, such as when reconfiguring the system from a packed state as illustrated in FIG. 15 to an unpacked state as illustrated in FIG. 16. A front wall 1600 of the back section 1404 includes a corresponding jog 1602 which also supported the computing device and allows the sections 1402, 1404 to align in the packed state shown in FIG. 15. In the unpacked state the edge of the docked computing device 100 rests against jog 1702 and the back of the computing device rests against jog 1602. The angle of inclination 1705 at which the computing device 100 is presented is thus generally a function of the thickness 500 of the computing device and the relative locations of the jogs 1602, 1702. The relative locations of the jogs 1602, 1702 changes based on the extent to which the front section 1402 is pivoted away from the back section 1404. In the unpacked state the front wall 1500 of the front section 1402 may rest flat against a support surface such as a table. However, the hinge 1406 may have a friction characteristic or locking function in order to facilitate adjustment of viewing angle. For example, the angle of inclination 1700 could be increased by pivoting the front section 1402 such that only the top front edge 1706 rests on the support surface. Further, the angle of inclination could be decreased by pivoting the front section such that only the bottom front edge 1708 rests on the support surface. Such adjustment and the location of jog 1702 may also facilitate docking of computing devices of various thicknesses, i.e., the system is not necessarily limited to use with computing devices having a specific thickness. A wired connector may be located at the ledge to support hard docking, aspects of which have already been described above. A wireless interface to support soft docking, aspects of which have also already been described above, may be included with or without the wired connector. The locations of transducers may or may not differ from the acoustic device shown in FIG. 2. For example, directional high frequency transducers 1604 may project sound from the top surface of the acoustic device, rather than partly or wholly from the front of the acoustic device, such that sound is directed toward the user when the front section is pivoted into the unpacked state shown in FIG. 16. Omni-directional low frequency transducers may be located in the back section, e.g., on the top wall, side walls, or both such as already described. Electronic interconnection between the front and back sections may be provided to interconnect various features including the transducers with the interface to the computing device.

Figure 19:
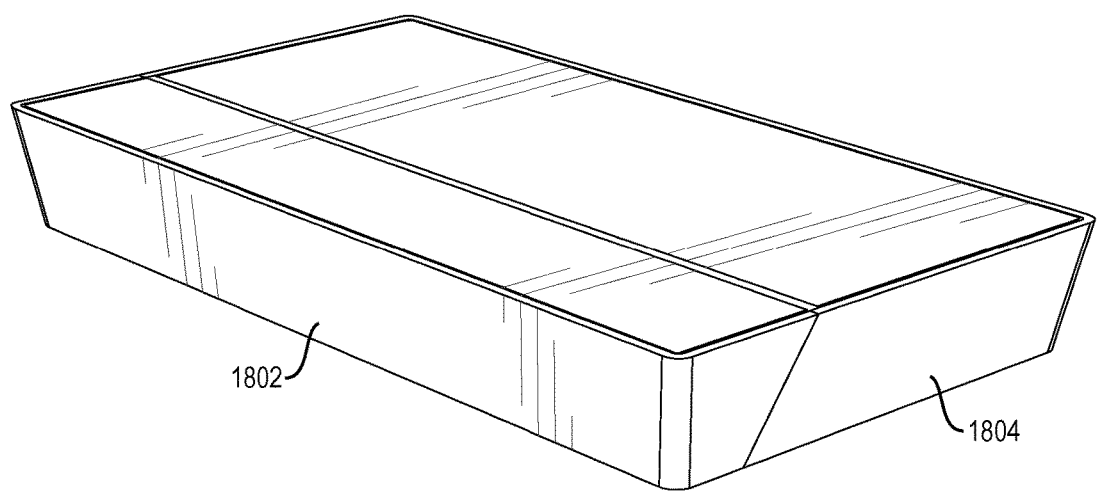
FIG. 19 is a perspective view of the acoustic device of FIG. 18 in a packed configuration.
Figure 20:
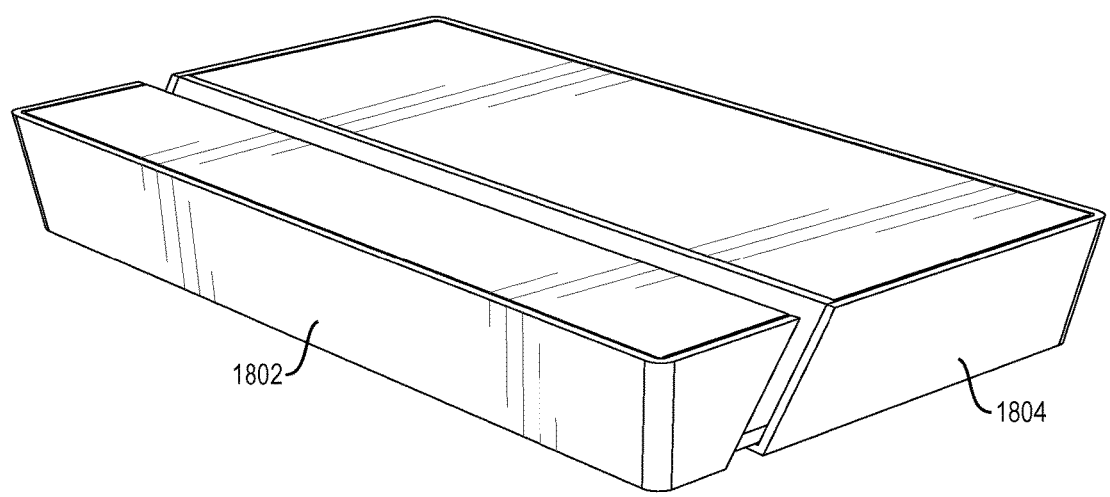
FIG. 20 is a perspective view of the acoustic device of FIG. 18 in an unpacked configuration.
Figure 21:
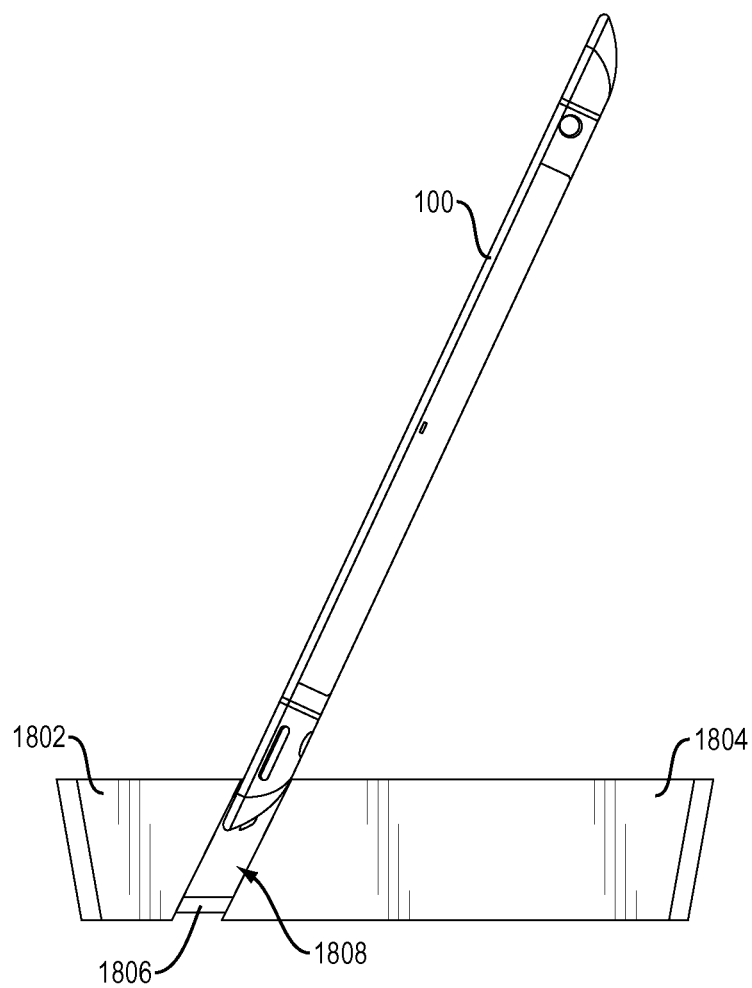
FIG. 21 is a side elevation of the system of FIG. 18.

FIGS. 18 through 21 illustrate another implementation in which the acoustic device 1800 includes two parts and a feature for supporting the computing device 100. The acoustic device may include any of the various features described above, but also includes a front section 1802 which is slidably connected to a back section 1804 via guides 1806. A supporting slot 1808 located between the front and back sections is presented by sliding the front section away from the back section, such as when reconfiguring the system from a packed state as illustrated in FIG. 19 to an unpacked state as illustrated in FIG. 20. A wired connector may be located proximate to the slot to support hard docking, aspects of which have already been described above. A wireless interface to support soft docking, aspects of which have also already been described above, may be included with or without the wired connector. The locations of transducers may or may not differ from the acoustic device shown in FIG. 2. The low frequency transducers may be located behind the docked computing device. Electronic interconnection between the front and back sections may be provided to interconnect various features including the transducers with the interface to the computing device.

Figure 22:
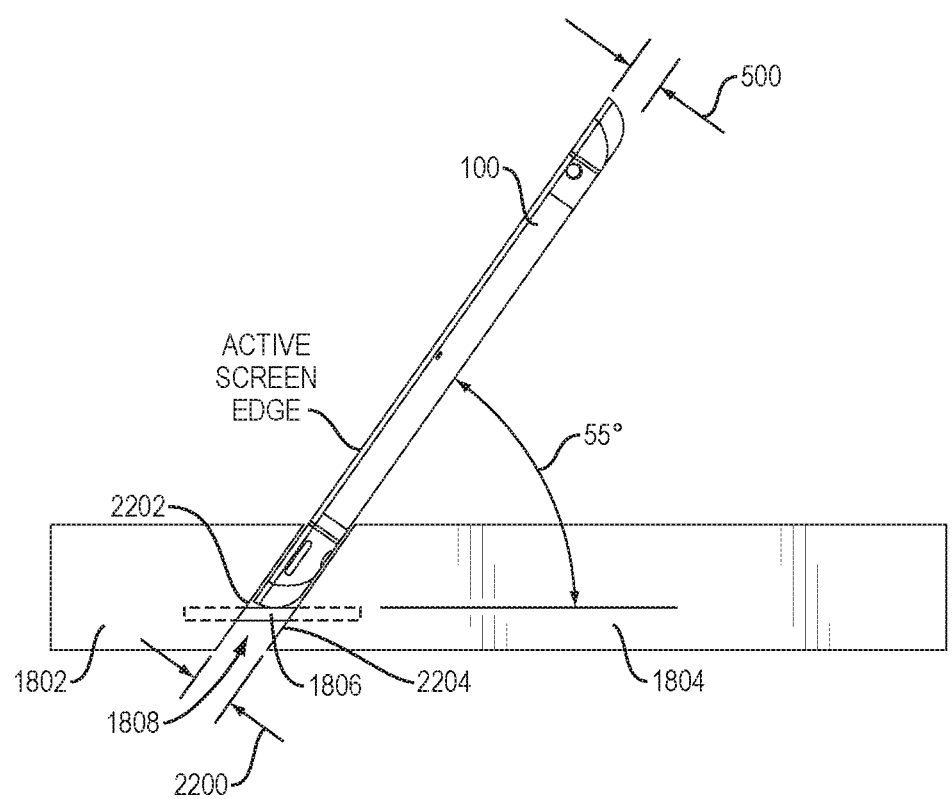
FIGS. 22 and 23 are side elevations which show adjustment of viewing angle by adjustment of slot size.
Figure 23:
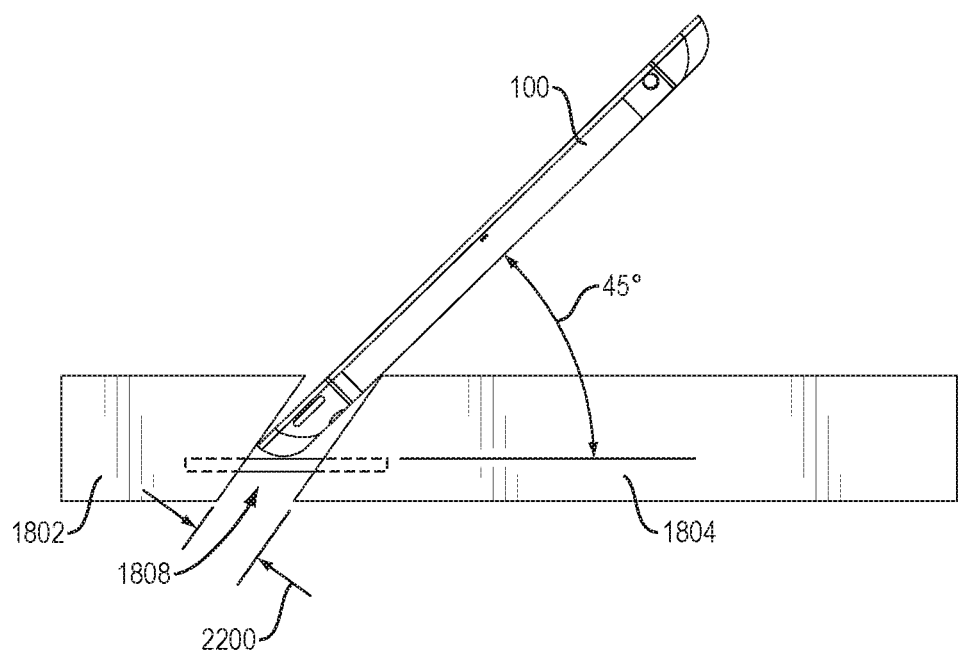

One aspect of the two-part sliding implementation of FIGS. 18 through 21 is that the width dimension 2200 of the slot 1808 can be adjusted to accommodate the thickness of the computing device. Moreover, the slot width can be adjusted to adjust the angle of inclination of the computing device. Change of slot width, which is not limited to the implementation of FIGS. 18 through 21, is shown by the increased slot width in FIG. 23 as compared with FIG. 22. FIG. 22 illustrates slot width 2200 adjusted to match the thickness dimension 500 of the computing device. The slide guides 1806 which connect the front and back sections 1802, 1804 may include a frictional characteristic or locking function in order to help secure the front section relative to the back section with the computing device held firmly in place therebetween. More particularly, the inner edge 2202 of the front section and the outer edge 2204 of the back section, which are parallel, may be adjusted to contact the overlapping surface area of the front and back of the computing device 100. The inner and outer edges 2202, 2204 are angled such that the angle of inclination of the computing device docked in this manner is determined by the angling of the edges relative to horizontal, e.g., 55 degrees in the illustrated example. However, as shown in FIG. 23, it is not necessary to match the slot width 2200 to the thickness 500 of the computing device. For example, the slot width 2200 can be adjusted to be greater than the thickness 500 of the computing device in order to decrease the angle of inclination, e.g., from 55 degrees to 45 degrees in the illustrated example.

A number of implementations have been described. Nevertheless, it will be understood that additional modifications may be made without departing from the scope of the inventive concepts described herein, and, accordingly, other embodiments are within the scope of the following claims.

What is claimed is:

1. An apparatus comprising:
   an accessory for supporting a flat mobile computing device having a display, processor, memory and battery within a housing having first and second sets of parallel edges, a back surface connected to the edges, and a front surface connected to the edges and including the display, the accessory comprising:
   a support which orients the computing device at an angle of inclination such that a first edge of the first set of parallel edges of the computing device is elevated relative to a second edge of the first set of parallel edges, the support adapted to accommodate a range of computing device thicknesses; and
   an acoustic device which generates an audio output in response to input from the computing device,
   wherein the support comprises a protective cover for the acoustic device,
   wherein the protective cover includes a top surface, a bottom surface, a set of parallel side surfaces connected to both the top and bottom surfaces, a back surface connected to the top, bottom, and side surfaces, and a front opening adapted to receive the acoustic device,
   wherein the acoustic device is slidably movable within the cover,
   wherein an interference fit is presented between the acoustic device and the cover, and
   wherein the angle of inclination of the computing device is adjustable based on an extent to which the acoustic device is inserted into the cover.

2. The apparatus of claim 1 wherein the cover includes an elongated opening in the top surface, the opening extending through a part of the side surfaces and adapted to receive one of the edges of the computing device.

3. The apparatus of claim 1 wherein the acoustic device includes first and second acoustic sources, the first acoustic source projecting sound from a front portion of the device and the second acoustic source projecting sound from a rear portion of the device.

4. The apparatus of claim 3 wherein the first acoustic source is adapted to produce higher frequency sound than the second acoustic source.

5. The apparatus of claim 4 wherein the first acoustic source is configured to project sound from in front of the flat mobile computing device and the second acoustic source is configured to project sound from behind the flat mobile computing device.

6. The apparatus of claim 3 wherein the cover includes openings in the top surface proximate to the second acoustic source.

7. The apparatus of claim 1 wherein the acoustic device includes a wired interface adapted to connect to the computing device.

8. The apparatus of claim 1 wherein the acoustic device includes a wireless interface adapted to connect to the computing device.

9. The apparatus of claim 1 wherein the angle of inclination is selected for presentation of video on the computing device.

10. The apparatus of claim 1 wherein the angle of inclination is settable by a user within a predetermined range.

11. The apparatus of claim 1 wherein the computing device is selected from: a tablet, a mini tablet, a slate, a phone, and a phablet.

12. The apparatus of claim 1, wherein the angle inclination is about 35 to about 75 degrees.

* * * * *